(12) United States Patent
Sato et al.

(10) Patent No.: US 7,181,909 B2
(45) Date of Patent: *Feb. 27, 2007

(54) CONTROL METHOD FOR AN EXHAUST GAS PURIFICATION SYSTEM AND AN EXHAUST GAS PURIFICATION SYSTEM

(75) Inventors: Hitoshi Sato, Fujisawa (JP); Nobuyuki Hiraki, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 11/100,391

(22) Filed: Apr. 7, 2005

(65) Prior Publication Data
US 2005/0223701 A1    Oct. 13, 2005

(30) Foreign Application Priority Data
Apr. 9, 2004    (JP) .............................. 2004-114976

(51) Int. Cl.
*F01N 3/00*    (2006.01)
(52) U.S. Cl. ..................... 60/297; 60/274; 60/277; 60/287; 60/291; 60/311
(58) Field of Classification Search .............. 60/274, 60/277, 285, 287, 291, 292, 295, 297, 311, 60/324
See application file for complete search history.

(56) References Cited

U.S. PATENT DOCUMENTS

| | | | | |
|---|---|---|---|---|
| 4,835,964 A | * | 6/1989 | Kume et al. ............... | 60/285 |
| 5,121,601 A | * | 6/1992 | Kammel ..................... | 60/275 |
| 5,287,698 A | * | 2/1994 | Shinzawa et al. .......... | 60/286 |
| 6,032,461 A | * | 3/2000 | Kinugasa et al. ........... | 60/295 |
| 6,865,885 B2 | * | 3/2005 | Kitahara ..................... | 60/297 |

(Continued)

FOREIGN PATENT DOCUMENTS

EP    1 229 223    8/2002

(Continued)

OTHER PUBLICATIONS

EP Search Report for corresponding application EP 05 10 2143 dated Jul. 22, 2005.

*Primary Examiner*—Binh Q. Tran
(74) *Attorney, Agent, or Firm*—Staas & Halsey LLP (57) ABSTRACT

When a forced regeneration is restarted after interrupting the forced regeneration, and in at least any one of cases where the collecting quantity area (Rpj) detected by the collecting quantity area detection means (32C) is in another collecting quantity area having a collecting quantity larger than that of the collecting quantity area (Rpi) immediately after interruption, or where the travel distance area (Rmj) detected by the travel distance area detection means (33C) is in another travel distance area, having a travel distance larger than that of the travel distance area (Rmi) immediately after interruption, the forced regeneration is performed from the start, and in other case, the forced regeneration is performed for the remained period of time of the previous forced regeneration, continuing to the previous forced regeneration.

Thereby, in the case of an exhaust gas purification system (1), provided with a DPF device (13), when the forced regeneration for the DPF device (13) is restarted after interruption, it is possible to sufficiently burn and remove the PM accumulated in the DPF (13*b*) and moreover, efficiently regenerate the DPF (13*b*).

5 Claims, 6 Drawing Sheets

U.S. PATENT DOCUMENTS 7,028,466 B2 *    4/2006   Kondou et al. ............... 60/295

FOREIGN PATENT DOCUMENTS

| EP | 1 375 877 | 1/2004 |
|---|---|---|
| JP | 03233125 | 10/1991 |
| JP | 5-187221 | 7/1993 |
| JP | 2003-83035 | 3/2003 |
| JP | 2003083035 | 3/2003 |

* cited by examiner

CONTROL METHOD FOR AN EXHAUST GAS PURIFICATION SYSTEM AND AN EXHAUST GAS PURIFICATION SYSTEM

BACKGROUND OF THE INVENTION

The present invention relates to an exhaust gas purification system that purifies particulate matters from the exhaust gas discharged by diesel and other internal combustion engines using a diesel particulate filter and also to a control method thereof.

In the same way as for NOx, CO, and also HC etc., restrictions on the volume of particulate matters (hereinafter "PM") discharged from diesel internal combustion engines grow severe every year. Techniques for collecting this PM in a filter known as a diesel particulate filter (hereinafter "DPF") and for reducing the quantity thereof by discharging externally have been developed. There is a continuous regeneration-type DPF device using DPF devices and a catalyst as one of them.

However, even in continuous regeneration DPF devices, increasing exhaust gas pressure as a result of filter clogging has become a problem. Although the PM collected by the DPF is continuously burned and purified, and the DPF will self-regenerate while the exhaust gas temperature is approximately 350° C. or greater, when the exhaust gas temperature is low or the traveling condition of an internal combustion engine has a low NO discharge—for example, when an internal combustion engine has a continuously low exhaust gas temperature accompanied by idling or low load/low speed traveling, etc.—the temperature of the exhaust gas drops and the catalyst becomes inactive as a result of the low temperature thereof. Accordingly, as the oxidization reaction does not progress and NO becomes insufficient, the above-described reaction does not take place, the PM is not oxidized, and the filter does not regenerate. Accordingly, the accumulation of PM in the filter continues and clogging thereof is accelerated.

Countermeasures for clogging of the filter, an exhaust gas purification system of an engine as below has been proposed, for example, as disclosed in Japanese patent application Kokai publication No. 2003-83035. When the amount of clogging of the filter has exceeded a predetermined amount, exhaust gas temperature is forcibly raised and the collected PM then forcibly removed through being burned. As for means for detecting the filter clogging, there are some methods such as a method for detecting by the differential pressure before and behind the filter, and a method for detecting through determination of the PM accumulation quantity by calculating in accordance of a map data in which the PM quantity to be collected is previously set based on the engine operation state. Besides, based on the differential pressure detected by engine speed and by a pressure sensor, a clogging state is estimated.

Moreover, as an exhaust gas temperature raising means, several methods are considered such as a method using an intra-cylinder fuel injection control such as a multi injection (multistage delay injection) and a post injection in an intra-cylinder injection, a method using a fuel control for a direct fuel injection into an exhaust pipe, and a method for an acceleration of self-regeneration by closing an exhaust throttle valve installed on the downstream side of a DPF during the regeneration and keeping the temperature of the DPF constant.

This intra-cylinder injection control raises the temperature of exhaust gas by performing multi injection (multistage retarded injection) when the exhaust gas temperature is lower than the active temperature of an oxidation catalyst installed on the upstream side of a filter or an oxidation catalyst supported on the filter. Then, when the exhaust gas temperature rises higher than the active temperature, a post injection is performed. The fuel added into the exhaust gas by the post injection is burned at the oxidation catalyst to raise a temperature of the exhaust gas not less than the temperature that PM collected in a filter is burned. Thereby, PM is burned and removed to regenerate the filter.

Normally, in the case of these continuous regeneration-type DPF devices, when the accumulated PM quantity reaches a preset accumulated PM limit value, the operation condition of an internal combustion engine is automatically changed to a forced regeneration mode operation. In the case of the forced regeneration mode operation, the PM collected by the filter is oxidized and removed to perform regeneration treatment.

Moreover, in order to solve the problem of oil dilution due to a post injection for raising an exhaust gas temperature at the time of forced regeneration, the following method is considered. This method uses not only the automatic forced regeneration during vehicle travels but also a manual regeneration for performing forced regeneration in a vehicle stationary idling condition by warning a driver of a filter clogging by flashing a DPF lamp to stop the vehicle and turn on a manual regeneration switch.

Moreover, in the case of the prior art, the forced regeneration is interrupted when an engine key is turned off or a PTO (Power Take Off) is actuated. Moreover, when the engine key is turned on or the PTO is not actuated, the forced regeneration is restarted to perform the forced regeneration for the remained period of time of the previous actuation. Furthermore, in the case where the driver starts the vehicle while performing the forced regeneration by a manual regeneration in a vehicle stationary condition, and the forced regeneration is interrupted and the forced regeneration is performed for a remained period of time in the next regeneration.

However, when the forced regeneration is interrupted at the time of PTO actuation, there is a problem that PM is accumulated while it is interrupted and the collected PM cannot be sufficiently burned or removed by performing forced regeneration only for the remained period of time when restarting the next forced regeneration.

Similarly, when a vehicle starts to travel during the manual regeneration, the forced regeneration is interrupted. However, in the case where long distance is traveled by the next regeneration, PM is collected beyond expectation to cause a problem that the PM accumulated in a DPF cannot be sufficiently burned or removed by performing forced regeneration only for the remained period of time when restarting the next forced regeneration.

The following exhaust particulate purification system is proposed in Japanese patent application Kokai publication No. 1993-187221. In this system, in order to avoid a vehicle from being stopped during an automatic traveling regeneration, a driver operates a cancel button and the like to cancel the filter regeneration and to perform regeneration when the vehicle travels next time. Thereby, it is possible to shift the timing of the filter regeneration from the timing the vehicle stops.

However, this exhaust particulate purification system has the following problem. It is necessary for a driver to operate the cancel button by recognizing a lamp turned on and the like. Therefore, the driver feels troublesome and moreover. And the driver does not necessarily operate the cancel button. Therefore, it is impossible to securely avoid a vehicle from being stopped during an automatic traveling regeneration.

SUMMARY OF THE INVENTION

It is an object of the present invention to provide a control method for an exhaust gas purification system and an exhaust gas purification system capable of sufficiently burning and removing the PM collected in a DPF and moreover efficiently regenerating the DPF when a forced regeneration is restarted after interruption in a DPF device.

In order to achieve the above described purpose, a control method for an exhaust gas purification system, in an internal combustion engine mounted on a vehicle provided with a DPF (diesel particulate filter) device in the exhaust passage thereof, having a DPF control means including; a collecting area detection means in which the collecting quantity area where the quantity of the collected matters collected in the filter of said DPF device belongs to is detected from within a plurality of collecting quantity areas which are sectionalized depending on the quantity of collected matters, a travel distance area detection means in which the travel distance area where the travel distance belongs to is detected from within a plurality of travel distance areas which are sectionalized depending on the travel distance, a regeneration timing judgment means for judging the regeneration timing of the filter, a forced regeneration control means for performing the forced regeneration of the filter by raising the exhaust gas temperature, in which said DPF control means actuates the forced regeneration control means when it is judged to be in a regeneration timing by the regeneration timing judgment means; wherein when the forced regeneration is restarted after interrupting the forced regeneration by the forced regeneration control means, and in at least any one of cases where the collecting quantity area detected by the collecting quantity area detection means is in another collecting quantity area having a collecting quantity larger than that of the collecting quantity area immediately after interruption, or where the travel distance area detected by the travel distance area detection means is another travel distance area, having a travel distance larger than that of the travel distance area immediately after interruption, a forced regeneration is performed from the start, and in other case, the forced regeneration is performed for the remained period of time of the previous forced regeneration, continuing to the previous forced regeneration.

Moreover, the above described control method for the exhaust gas purification system is characterized in that said diesel particulate filter control means has a manual regeneration mode for performing the forced regeneration control of the filter when a driver presses a manual regeneration switch upon a warning to perform a regeneration control in a vehicle stationary idling condition, and an automatic traveling regeneration mode for automatically performing the forced regeneration control of the filter when a vehicle travels.

Furthermore, the above described exhaust gas purification system, in an internal combustion engine mounted on a vehicle provided with a diesel particulate filter device in the exhaust gas passage thereof, having a diesel particulate filter control means including; a collecting area detection means in which the quantity area where the quantity of the collected matters collected in the filter of said diesel particulate filter device belongs to is detected from within a plurality of collecting quantity areas which are sectionalized depending on the quantity of collected matters, a traveling distance area detection means in which the travel distance area where the travel distance belongs to is detected from within a plurality of travel distance areas which are sectionalized depending on the travel distance, a regeneration timing judgment means for judging the regeneration timing of the filter, a forced regeneration control means for performing the forced regeneration of the filter by raising the exhaust gas temperature, in which said diesel particulate filter control means actuates the forced regeneration control means when it is judged to be in a regeneration timing by the regeneration timing judgment means; wherein the DPF control means is so constituted that when restarting the forced regeneration after interrupting the forced regeneration by the forced regeneration control means, and in at least any one of cases where the collecting quantity area detected by the collecting quantity area detection means is in another collecting quantity area having a collecting quantity larger than that of the collecting quantity area immediately after interruption, or where the travel distance area detected by the travel distance area detection means is another travel distance area having a travel distance larger than that of the travel distance area immediately after interruption, the forced regeneration is performed from the start, and in other case, the forced regeneration is performed for the remained period of time of the previous forced regeneration, continuing to the previous forced regeneration.

Furthermore, the above exhaust gas purification system is characterized in that said diesel particulate filter control means comprises a manual regeneration mode for performing the forced regeneration control of the filter when a driver presses a manual regeneration switch upon warning to perform a regeneration control under a vehicle stationary idling condition, and a automatic traveling regeneration mode for automatically performing the forced regeneration control of the filter when a vehicle travels.

Furthermore, the above exhaust gas purification system is further characterized in that the diesel particulate filter device is constituted of any one or a combination of, a diesel particulate filter device formed of a filter without supporting catalyst, a continuous regeneration-type diesel particulate filter device supporting an oxidation catalyst on the filter, a continuous regeneration-type diesel particulate filter device in which an oxidation catalyst is installed on the upstream side of the filter, and a continuous regeneration-type diesel particulate filter device in which an oxidation catalyst is supported on the filter and an oxidation catalyst is installed on the upstream side of the filter.

According to the control method for the exhaust gas purification system and the exhaust gas purification system of the present invention, when the forced regeneration is restarted after interrupting the forced regeneration in the DPF device, and during the interruption of the regeneration, in at least any one of cases where the collecting quantity area is in another collecting quantity area having a collecting quantity larger than that of the collecting quantity area immediately after interruption, or where the travel distance area is in another travel distance area having a travel distance larger than that of the travel distance area immediately after interruption, the forced regeneration is performed from the start.

Therefore, it is possible to sufficiently burn and remove the PM collected in a DPF. Moreover, in the case other than the above case, a forced regeneration is performed for the remained period of time of the previous forced regeneration control continuing to the previous forced regeneration. Thereby, the DPF can be efficiently regenerated.

DETAILED DESCRIPTION OF THE PREFERRED EMBODIMENT

Hereinafter, the preferred embodiments of the control method for an exhaust gas purification system and the exhaust gas purification system according to the present invention will be described with reference to the accompanying drawings. The following explanation will use the example of an exhaust gas purification system provided with a continuous regeneration-type DPF device comprising a combination of an oxidation catalyst and a filter with a catalyst.

Figure 1:
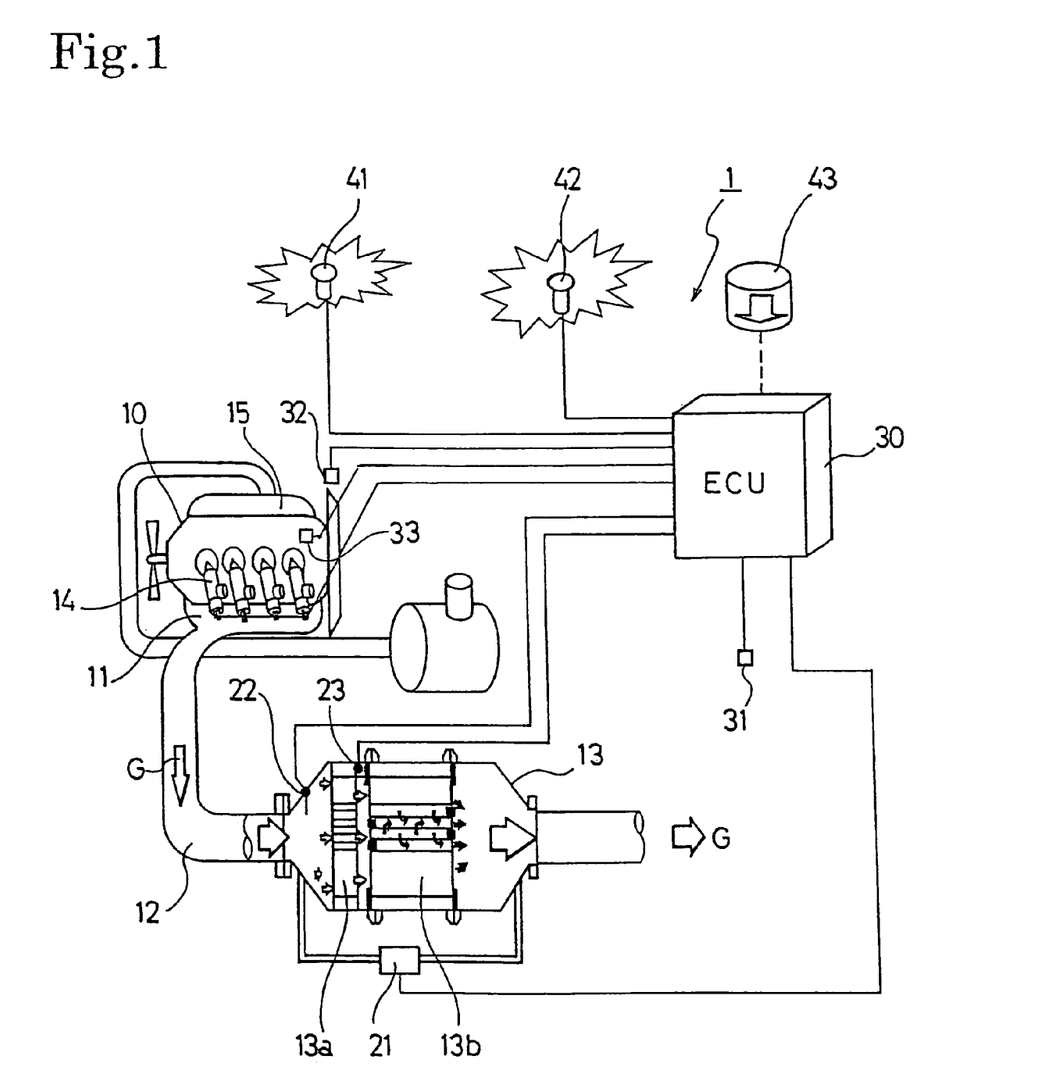
FIG. 1 is a systematic block diagram of an exhaust gas purification system according to an embodiment of the present invention.

FIG. 1 shows the configuration of an exhaust gas purification system 1 for an internal combustion engine according to an embodiment of the present invention. This exhaust gas purification system 1 is configured to provide a continuous regeneration DPF (diesel particulate filter) device 13 on an exhaust passage 12 connected to an exhaust manifold 11 of a diesel engine 10. This continuous regeneration-type DPF device 13 is configured with an oxidation catalyst 13a on the upstream side thereof and a filter with catalyst 13b on the downstream side thereof.

The oxidation catalyst 13a is formed so as to support an oxidation catalyst of platinum (Pt) etc. on a support with a ceramic honeycomb structure etc. The filter with catalyst 13b is formed of a monolithic honeycomb type, wall flow type filter with entrances and exits to channels in a porous ceramic honeycomb alternately closed or a felt-type filter with randomly layered alumina other inorganic fibers or the like etc. A platinum or cerium oxide etc. catalyst is supported on this filter portion.

In cases where a monolithic honeycomb type, wall flow type filter is used as the filter with catalyst 13b, the PM (particulate matter) contained in the exhaust gas is collected (trapped) in the porous ceramic walls. When a fabric type filter type is used, PM is collected in the inorganic fibers thereof.

A differential pressure sensor 21 is provided on the conduit tube in front of and behind the continuous regeneration DPF device 13 in order to estimate the collecting quantity of PM on the filter with catalyst 13b. For the purpose of regeneration control of the filter with catalyst 13b, furthermore, an oxidation catalyst inlet exhaust gas temperature sensor 22 is provided upstream of the oxidation catalyst 13a and a filter inlet exhaust gas temperature sensor 23 is provided between the oxidation catalyst 13a and the filter with catalyst 13b.

The output values from these sensors are input to an engine control unit (ECU) 30. In addition to controlling the overall operation of the engine 10, the engine control unit also performs regeneration control of the operation of the continuous regeneration-type DPF device 13. In accordance with the control signals output from this engine control unit 30, the fuel injection devices (i.e., injection nozzles) 14 of the engine 10, the intake throttle valve (not shown) adjusting the intake quantity of the intake manifold 15 and the EGR valve for adjusting the EGR volume are also controlled thereby. The EGR valve is provided together with the EGR cooler on the EGR passage (not shown).

These fuel injection devices 14 are connected to a common-rail fuel injection system (not shown) storing temporarily the fuel pressurized to high pressure by the fuel pump (not shown). In order to operate the engine, the accelerator opening from the accelerator position sensor (APS) 31 and the engine speed from the engine speed sensor 32 etc. are input into the engine control unit 30 together with other data such as the vehicle speed and cooling water temperature, etc.

Figure 2:
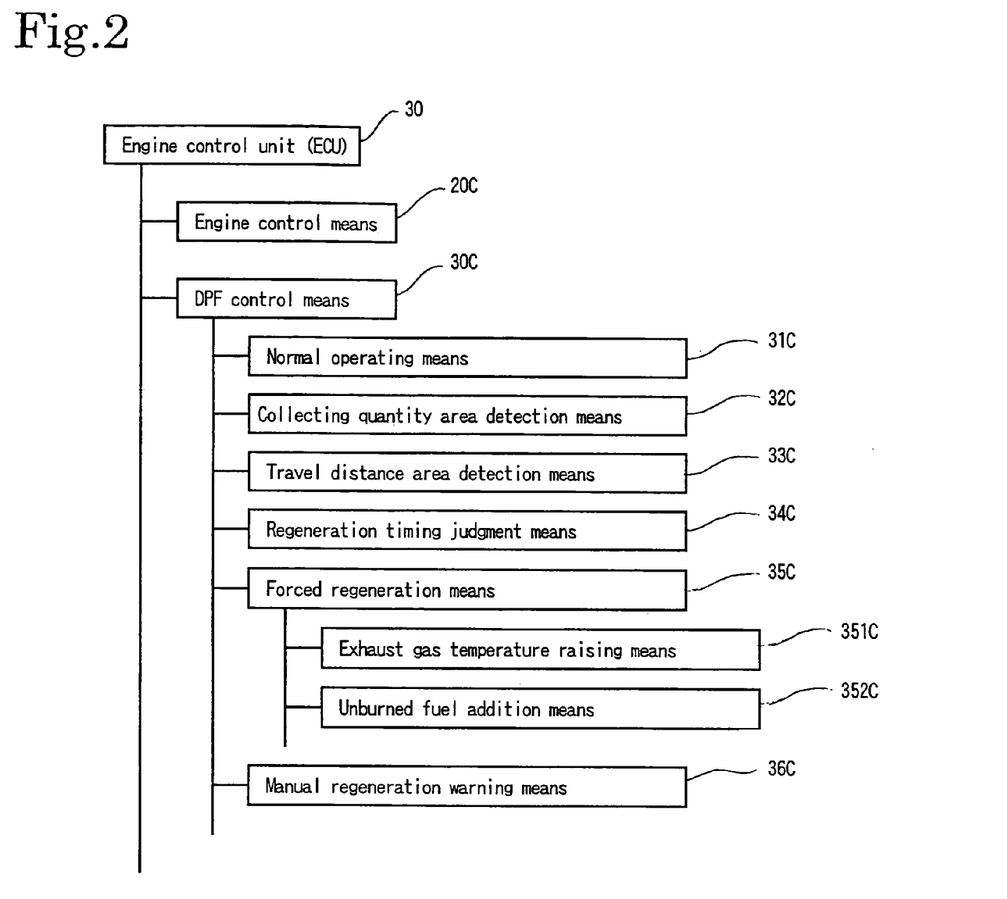
FIG. 2 is a drawing showing a configuration of a control means for the exhaust gas purification system according to the embodiment of the present invention.

As shown in FIG. 2, the engine control unit 30 according to the present invention comprises an engine control means 20C controlling operating of the engine and a DPF control means 30C for the exhaust gas purification system 1 etc. The DPF control means 30C comprises a normal operating control means 31C, a collecting quantity area detection means 32C, a travel distance area detection means 33C, a regeneration timing judgment means 34C, a forced regeneration means 35C, a manual regeneration warning means 36C etc.

The normal operating control means 31C is in particular a means for performing normal operating unrelated to regeneration of the continuous regeneration DPF device 13. In normal operating control means 31C, normal injection control is carried out wherein a predetermined volume of fuel is injected from the fuel injection devices 14 in accordance with an electric current time signal calculated in the engine control unit 30 based on signals from the accelerator position sensor 31 and signals from the engine speed sensor 32.

The collecting area detection means 32C is a means for detecting the PM collecting quantity ΔPm collected in the filter with catalyst 13b of the continuous regeneration-type DPF device 13, and detecting the collecting quantity area where the collecting quantity belongs to from within a plurality of collecting quantity areas which are sectionalized depending on the collected quantity to determine the collecting quantity area. In this embodiment, the collecting quantity area is detected utilizing the differential pressure before and after the continuous regeneration DPF device 13, or the detected value of differential pressure ΔPm by the differential pressure sensor 21. That is, the differential pressure area is used as the collecting quantity area.

The travel distance area detection means 33C is a means for detecting the travel distance ΔMc traveled by the vehicle after DPF regeneration. Then, the travel distance area where the distance ΔMc belongs to is detected from within a plurality of travel distance areas which are sectionalized depending on the travel distance to determine the travel distance. Whenever the forced regeneration is carried out, the travel distance ΔMc is reset at the end thereof.

The regeneration timing judgment means 34C is a means for judging a regeneration start timing of the DPF by determining the areas where the collecting quantity area detected by the collecting area detection means 32C and the travel distance detected by the travel distance area detection means 33C belong to.

Although the control varies slightly in accordance with the type of the continuous regeneration-type DPF device 13, the forced regeneration means 35C comprises an exhaust gas temperature raising means 351C and an unburned fuel addition means 352C. The exhaust gas temperature raising means 351C performs so-called multi injection (multistage retarded injection) with which an auxiliary injection is executed after a main injection at a timing delayed from a normal burn so as to continue the burn at a delayed timing in an intra-cylinder injection of the engine 1, raising the exhaust gas temperature to the active temperature of the oxidation catalyst 13a. The unburned fuel addition means 352C performs post injection thereafter, supplying unburned fuel to the exhaust gas as well as the exhaust gas temperature raising control by the multi injection, and oxidizing the unburned fuel by the oxidation catalyst 13a. Then the filter inlet exhaust gas temperature detected by the filter inlet exhaust gas temperature sensor 23 is raised, realizing a suitable temperature and environment for PM oxidation and removal.

In accordance with the exhaust gas temperature raising control and the unburned fuel addition control of these means 351C and 352C, the PM accumulated on the filter with catalyst 13b is forcibly burned and removed, and the filter with catalyst 13b is forcibly regenerated. Furthermore, in addition to the multi injection, the exhaust gas temperature raising means 351C is also possible to use the exhaust throttle control. Furthermore, it is also possible to use the intake throttle control and the EGR control in combination during the course of control by the exhaust gas temperature raising and unburned fuel addition.

The manual regeneration warning means 36C comprises a flashing lamp (or DPF lamp) 41 and a warning lamp 42, etc. The manual regeneration warning means 36C is a means for urging the driver through flashing of the flashing lamp 41 to manually actuate the forced regeneration means 35C, and through the lighting of the warning lamp 42, to bring the vehicle to a service center. Furthermore, upon receiving of this warning, the driver stops the vehicle and operates the manual regeneration switch 43. Thereby, the forced regeneration means 35C is actuated and the forced regeneration is performed in a stop idle state.

And the DPF control means 30C is constructed as a means which continues the normal operation by the normal operating means 31C, urges the driver to manually actuate the forced regeneration means 35C, and actuates automatically the forced regeneration means 35C based on the collecting quantity area collected by collecting area detection means 32C and the travel distance area detected by the travel distance area detection means 33C.

Then, the DPF regeneration control of the exhaust gas purification system 1 is described below. In the case of the control of the exhaust gas purification system 1, normal operation is performed by normal operating control means 31C to collect PM. In this normal operation, when the start of regeneration is judged by a regeneration start timing judgment means 34C, a warning by a manual regeneration warning means 36C or automatic traveling regeneration by a forced regeneration means 35C is performed.

That is, the necessity of a manual regeneration or an automatic traveling regeneration is determined depending on the areas where the collecting quantity area detected by the collecting area detection means 32C and the travel distance detected by the travel distance area detection means 33C belong to. Moreover, the normal operation is performed by the normal operating control means 31C after various operations are performed as necessary. Then, a vehicle is driven repeating the normal operation and the DPF regeneration control.

Figure 5:
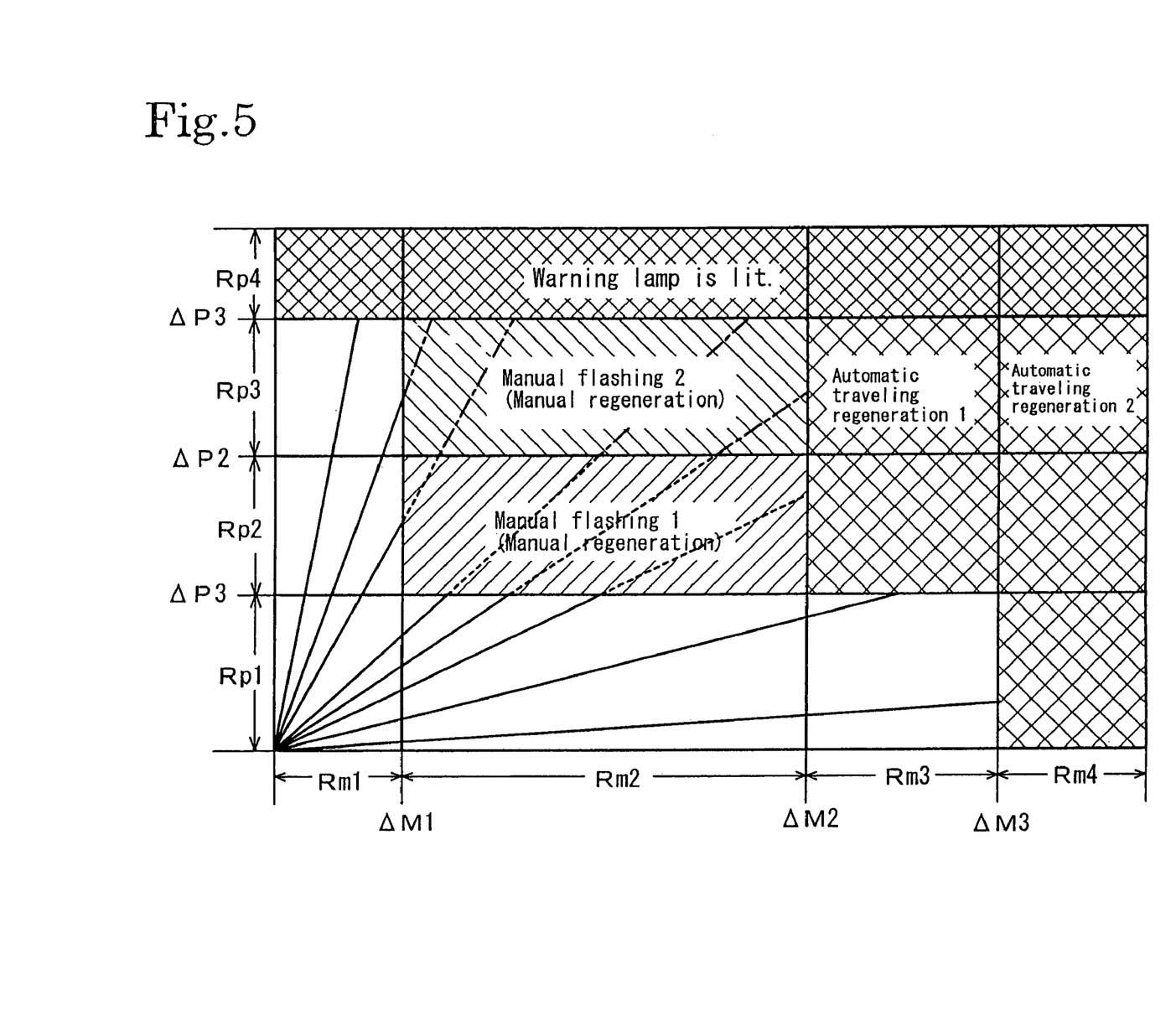
FIG. 5 is a drawing showing in a schematic manner a regeneration control map of the exhaust gas purification.

The regeneration control is described by referring to the regeneration control map shown in FIG. 5. The regeneration control can be performed in accordance with the regeneration control flow shown in FIG. 6.

First, when the travel distance $\Delta Mc$ is in a first travel distance area Rm1 which is smaller than the first threshold value $\Delta M1$, a problem of oil dilution occurs by performing forced regeneration because the evaporation of the fuel in oil is insufficient. Therefore, the regeneration control is inhibited in order to avoid the problem.

Then, when the travel distance $\Delta Mc$ is in a predetermined second travel distance area Rm2 between the first threshold value $\Delta M1$ and the second threshold value $\Delta M2$, the automatic forced regeneration is not performed because traveling is still insufficient and the fuel mixed in engine oil is not sufficiently evaporated. When the collecting quantity $\Delta Pm$ enters from a first collecting quantity area Rp1 into a second collecting quantity area (manual flashing 1) Rp2 which exceeds the first threshold value $\Delta P1$, a repeater indicator (DPF lamp) 41 is slowly flashed. This prompts manual regeneration for performing forced regeneration by stopping a vehicle and pressing a manual regeneration switch 43. Moreover, when the collecting quantity $\Delta Pm$ enters from the second collecting quantity area Rp2 into a third collecting quantity area Rp3 (manual flashing 2) which exceeds the second threshold value $\Delta P2$ larger than the first threshold value $\Delta P1$, the repeater indicator 41 is quickly flashed. Thereby, a driver is strongly prompted to actuate manual forced regeneration after stopping the vehicle.

Furthermore, when the travel distance $\Delta Mc$ is in a predetermined third travel distance Rm3 between the second threshold value $\Delta M2$ and third threshold value $\Delta M3$, the fuel mixed in engine oil is sufficiently evaporated. Therefore the automatic forced regeneration during traveling (automatic traveling regeneration) can be made. Thereby, when the collecting quantity $\Delta Pm$ enters into the second collecting quantity area (automatic traveling regeneration 1) Rp2, exceeding the first threshold value $\Delta P1$, a forced regeneration control is automatically performed. By the automatic traveling regeneration, the load on the manual forced regeneration by a driver, that is, the on/off operation of the manual regeneration switch 43 is decreased.

Moreover, independently of the collecting quantity $\Delta Pm$, when the travel distance $\Delta Mc$ is in a predetermined forth collecting quantity area (automatic traveling regeneration 2) Rm4 exceeding the third threshold value $\Delta M3$, the forced regeneration is automatically performed. Thereby, heat runaway due to uneven accumulation of PM in the filter with catalyst 13b is prevented and the dissolution loss of DPF is prevented.

When the collecting quantity $\Delta Pm$ is in a forth collecting quantity area (alarm lamp flashing) Rp4, exceeding the third threshold value $\Delta P3$ independently of the travel distance $\Delta Mc$, a condition is set in which manual regeneration and automatic traveling regeneration are inhibited in order to avoid a heat runaway which is a rapid burning of PM. Therewith, a warning lamp 42 for prompting a driver to bring the vehicle to a service center.

Therefore, the DPF control means 30C is constituted by including a manual regeneration mode for performing the forced regeneration control of the filter with catalyst 13b when a driver presses the manual regeneration switch 43 upon a warning to perform regeneration control while a vehicle is in a stationary idling condition and an automatic traveling regeneration mode for automatically performing the forced regeneration control of the filter with catalyst 13b while the vehicle is in a traveling condition.

Figure 6:
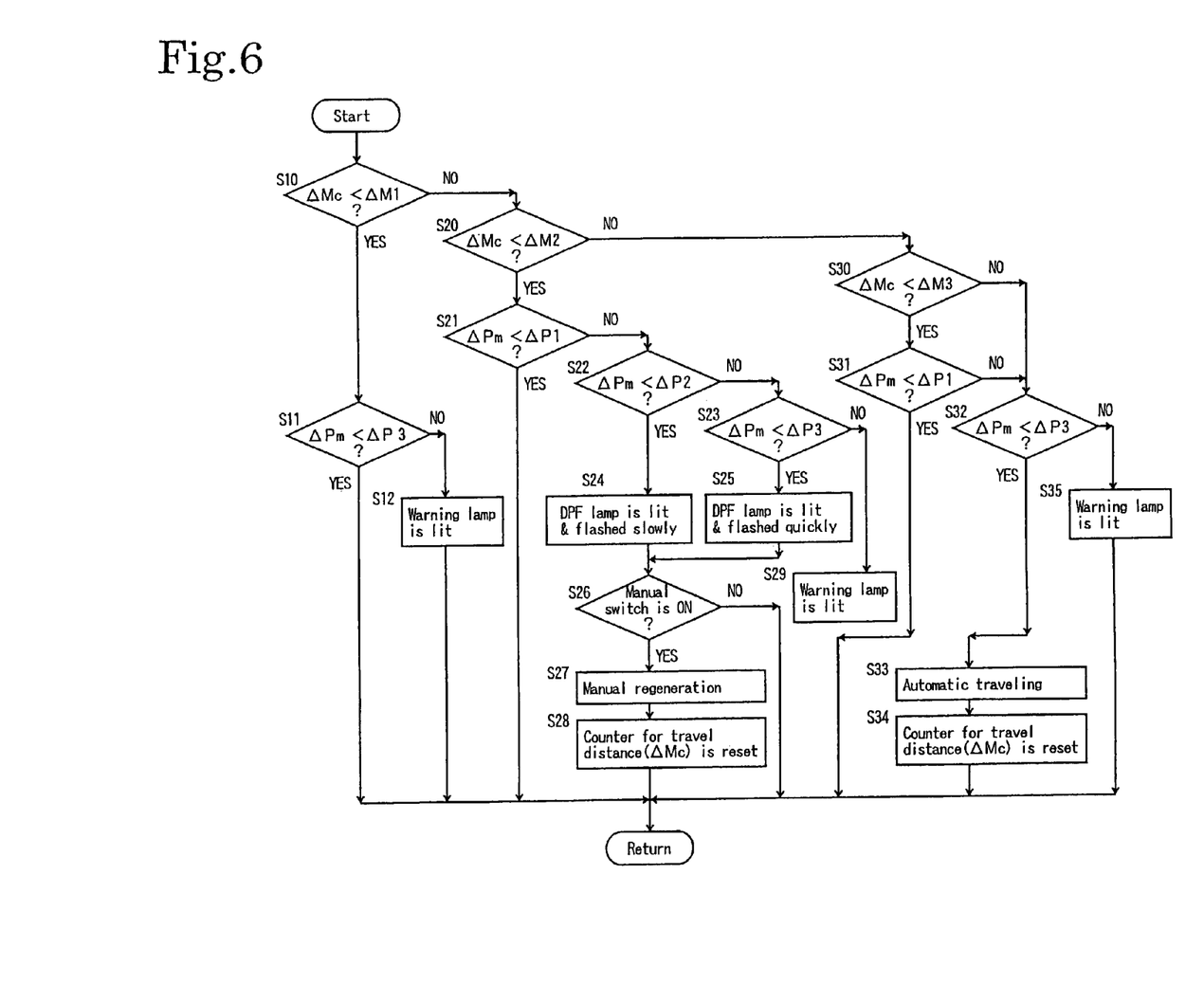
FIG. 6 is a drawing showing an example of the regeneration control flow of the exhaust gas purification system.

Moreover, in the case of the present invention, as shown in FIG. 6, when the forced regeneration of the DPF device 13 is performed by the forced regeneration means 35C through the manual regeneration in step S27 or the automatic traveling regeneration in step S33, the DPF control means 30C is constituted as shown below so that when the forced regeneration is restarted after interrupting the forced regeneration, the PM which is collected and accumulated in the DPF device 13 can be burned and removed sufficiently to make the DPF device 13 capable of being regenerated.

This DPF control means 30C is constituted as described below. When a forced regeneration by the forced regeneration control means 35C is restarted after interruption, the forced regeneration is performed from the start when the collecting quantity area Rpj detected by the collecting quantity area detection means 32C is in a collecting quantity area Rpx having the collecting quantity ΔPm larger than that of a collecting quantity area Rpi immediately after interruption or a travel distance area Rmj detected by the travel distance area detection means 33C is in a travel distance area Rpx having a travel distance ΔMc larger than that of the travel distance area Rpi immediately after interruption. In the case other than the above, the forced regeneration is performed for a remained period of time continuing to the previous forced regeneration. That is, during interruption of the regeneration, when the collecting quantity area (differential pressure area) Rpj or the travel distance area Rmj rises, the control is constituted to perform the forced regeneration from the start.

Figure 3:
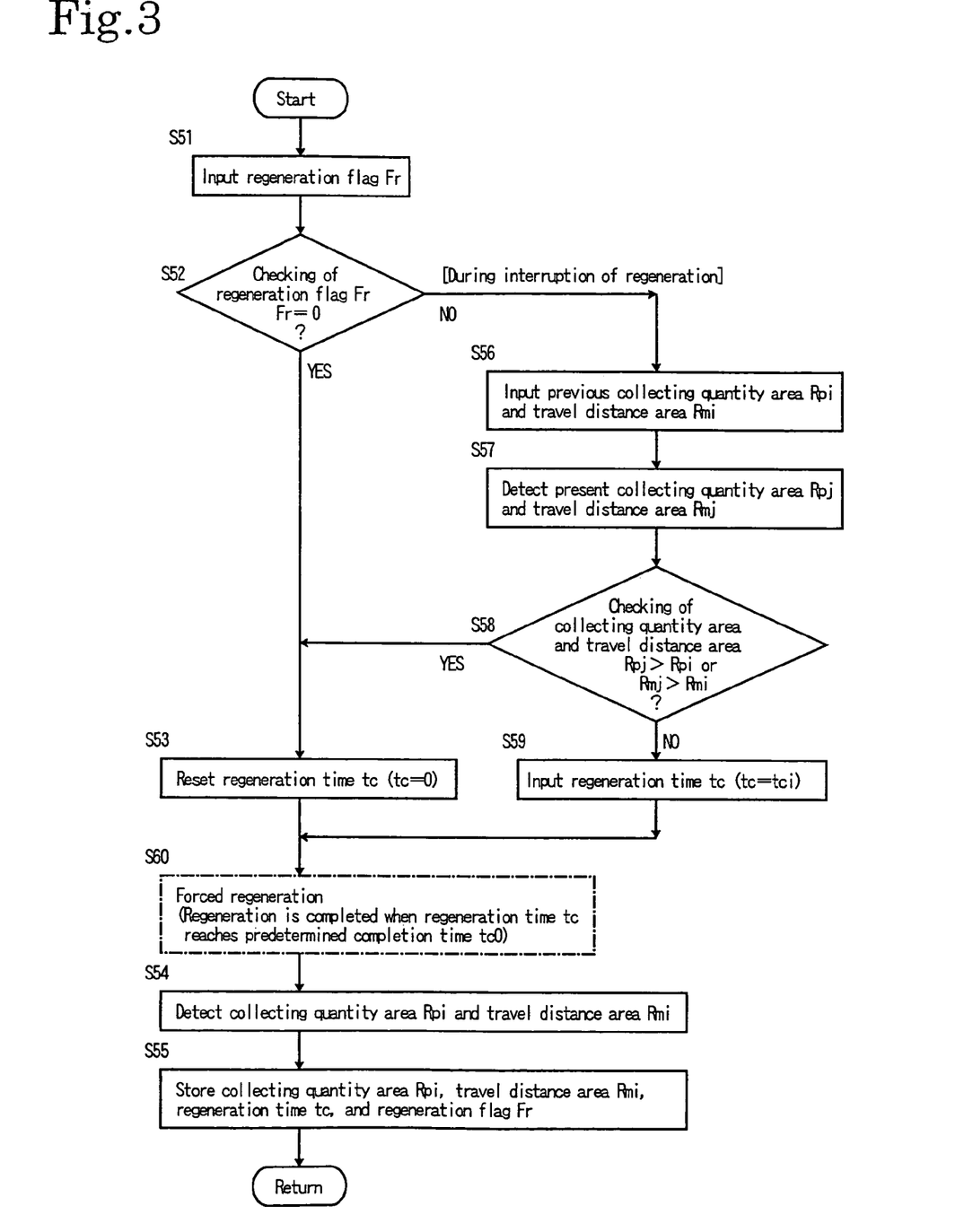
FIG. 3 is a drawing showing an example of a control flow of a forced regeneration according to the embodiment of the present invention.
Figure 4:
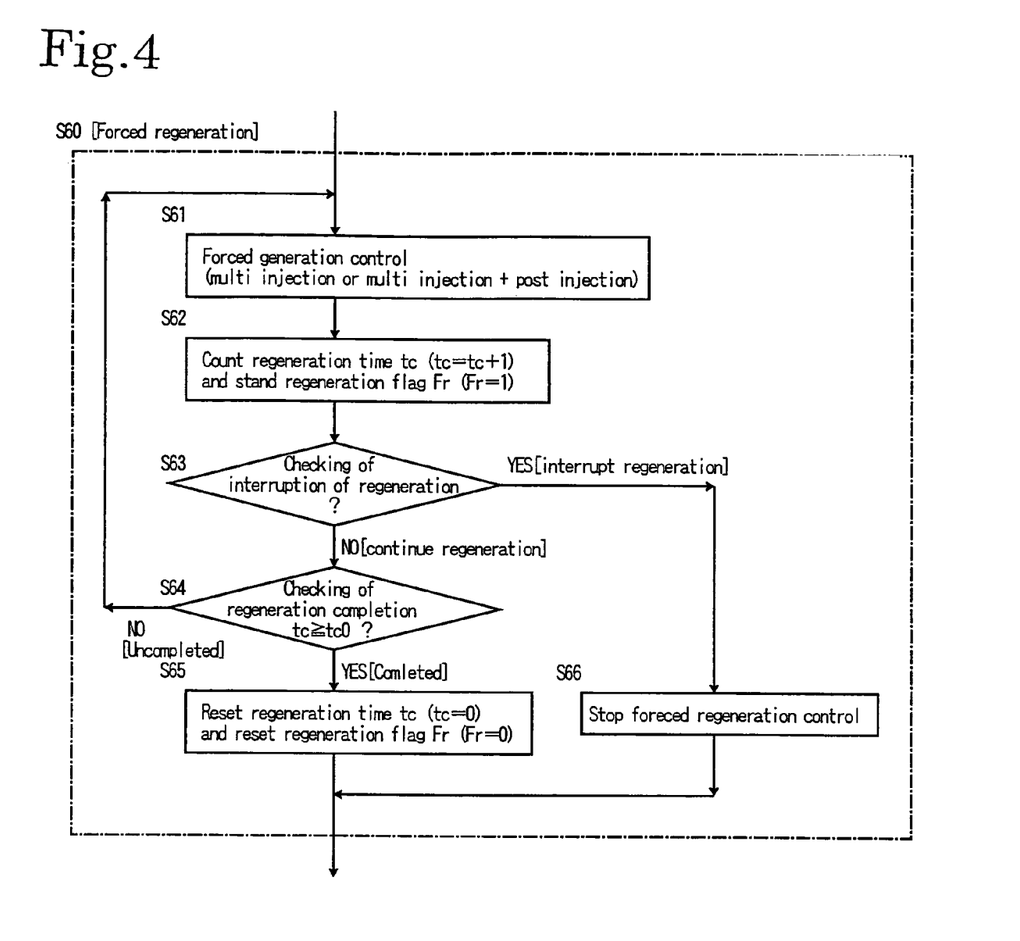
FIG. 4 is a drawing showing of a more detailed control flow of a step of a part of FIG. 3

Then, the forced regeneration control can be executed in accordance with the control flow shown in FIGS. 3 and 4. The control flow in FIGS. 3 and 4 is shown as a control flow which is called when performing a forced regeneration of the DPF device 13 by the forced regeneration means 35C through the manual regeneration in step S27 or the automatic traveling regeneration in step S33 in FIG. 6.

When the control flow in FIG. 3 is called and started, it is checked whether the regeneration is interrupted during the previous forced regeneration by inputting the regeneration flag Fr value of the previous regeneration in step S51 to be checked in the next step S52. That is, when the regeneration flag Fr is zero (Fr=0), the regeneration is completed and it is judged to be at the new regeneration start timing after regeneration completion. Moreover, when the regeneration flag Fr stands (Fr=1), it is judged to be at the regeneration start timing after interruption.

When it is judged to be at a new regeneration start timing after regeneration is completed through the judgment in step S52, the count tc of regeneration time is reset to zero (tc=0) in step S53 and then a forced regeneration in step S60 is performed.

As shown in FIG. 4, in the case of the forced regeneration in this step S60, the forced regeneration control is performed by the forced regeneration means 35C in step S61. In this case, though a detailed control flow is omitted, an exhaust gas temperature detected by an oxidation catalyst inlet exhaust gas temperature sensor 22 or filter inlet exhaust gas temperature sensor 23 is checked. When the exhaust gas temperature is low, only an exhaust gas temperature raising control by multi injection (multistage retarded injection) is performed for a predetermined control time. Moreover, when the exhaust gas temperature is high after, for example, performing the exhaust gas temperature raising control, an unburned fuel addition control by a post injection is performed for a predetermined control time in addition to the exhaust gas temperature control by a multi injection. The predetermined control time is the time relating to the interval for judging whether to interrupt regeneration control, and this time is set in advance. In this case, intake throttle control, exhaust throttle control, or EGR control and the like together with the above control can be also performed.

After the forced regeneration control, the regeneration time tc is counted (tc=tc+1) in step S62 to stand the regeneration flag Fr (Fr=1). Then, it is judged in the next step S63 whether to interrupt regeneration.

When the regeneration is judged whether to be continued in this step S63 that, it is judged in step S64 whether the regeneration is completed. The completion of the regeneration is judged by checking whether the count tc of regeneration time is not less than a predetermined judgment value tc0. And the regeneration is judged to be completed when the count tc exceeds the predetermined judgment value tc0. Then, when it is judged in this step S64 that the regeneration is not completed, step S61 is restarted to repeat the forced regeneration control.

However, when it is judged in step S64 that the regeneration is completed, the regeneration flag Fr and the count tc of regeneration time are respectively reset to zero (Fr=0, tc=0), the forced regeneration in step S60 is completed, and the step goes to step 54 in FIG. 3.

Moreover, when it is judged in step S63 to interrupt the regeneration, step S66 is started to stop the forced regeneration control. Then, the forced regeneration in step S60 is completed to start step S54 in FIG. 3. The case of the interruption includes a case in which an engine key is turned off, a case in which the actuation of a PTO, (Power Take Off) is started, and a case in which a driver starts traveling of a vehicle during vehicle-stop manual regeneration. Interruption or continuity of regeneration is determined in accordance with signals from sensors or devices for monitoring each state.

After completing the forced regeneration in step S60, the point of this time, in other words, the collection quantity area Rpi and travel distance area Rmi immediately after completion of regeneration or immediately after interruption of regeneration is detected in step S54 in FIG. 3. In the next step S55, the detected collecting quantity area Rpi, travel distance area Rmi, regeneration time tc and regeneration flag Fr are stored. Then, the control is returned.

Then, when the regeneration flag Fr stands (Fr=1) in the judgment in step S52 and it is judged to be at the start timing of regeneration after interruption, the control goes to step S56. In the step S56, the collecting quantity area Rpi and the travel distance area Rmi stored in the previous regeneration control and detected immediately after interrupting the previous regeneration control are input. In the next step S57, a collecting quantity area Rpj and travel distance area Rmj at present are detected.

In the next step S58, it is judged whether the present collecting quantity area Rpj is in another area having a collecting quantity larger than that of the previous collecting quantity area Rpi or the present travel stance area Rmj is in another area having a travel distance larger than that of the previous travel distance area Rmi.

Moreover, when at least any one of them is satisfied, step S53 is started to reset the count tc of regeneration time to zero (tc=0). Then, the forced regeneration control in step S60 is performed. That is, the forced regeneration control is performed from the start. After the forced regeneration in this step S60 is completed, steps S54 and S55 are performed and the control is returned.

Moreover, when the both are not satisfied, the control goes to step S59 and the count tci of the regeneration time stored at previous time is input and the count tc of the regeneration time is replaced by the count tci (tc=tci). Then, step S60 is started to perform the forced regeneration continuing to the previous forced regeneration for the previously remained period of time (tcr=tc0−tci). After the forced regeneration in this step S60 is completed, steps S54 and S55 are performed and the control is returned.

According to the control flows in FIGS. 3 and 4, when the control flow in FIG. 3 is called from the control flow in FIG. 6, the control flow is started in step S51 to complete or interrupt regeneration while the steps are repeated within. Then, steps S54 and S55 are completed and the control is returned.

Then, when the control flow in FIG. 3 is called from the control flow in FIG. 6 again and the previous regeneration is completed, the count tc of the regeneration time is reset to perform a forced regeneration control from the start.

Moreover, when the previous regeneration is not completed but it is restarted after the forced regeneration by the forced regeneration control means 35C is interrupted, the count tc of the regeneration time is reset to perform the forced regeneration control from the start when the collecting quantity area Rpj detected by the collecting quantity area detection means 32C is in another collecting quantity area having a collecting quantity larger than that of the collecting quantity area Rpi immediately after interruption or the travel distance area Rmj detected by the travel distance area detection means 33C is another travel distance area having a travel distance larger than that of the travel distance area Rmi immediately after interruption.

In the case other than the above, that is, when the collecting quantity area Rpj detected by the collecting quantity area detection means 32C is not in another collecting quantity area having a collecting quantity larger than that of the collecting quantity area Rpi immediately after interruption and the travel distance area Rmj detected by the travel distance area detection means 33C is not in another travel distance area having a travel distance larger than that of the travel distance area Rmj immediately after interruption, forced regeneration is performed continuing to the previous forced regeneration.

In the case of this embodiment, another collecting quantity area having a large collecting quantity is, specifically, any one of second collecting quantity area Rp2 and third collecting quantity area Rp3 for the first collecting quantity area Rp1, and the third collecting quantity area Rp3 for the second collecting quantity area Rp2. Moreover, a travel distance area having a large travel distance is any one of second travel distance area Rm2, third travel distance area Rm3 and fourth travel distance area Rm4 for the first travel distance area Rm1, and any one of the third travel distance area Rm3 and the fourth travel area Rm4 for the second travel distance area Rm2, and the fourth travel area Rm4 for the third travel distance area Rm3.

Therefore, when forced regeneration is restarted after the regeneration of filter with catalyst 13b of the continuous regeneration-type DPF device 13 is interrupted during forced regeneration, forced regeneration is performed from the start when the collecting quantity area Rpj or travel distance area Rmj rises when the regeneration is interrupted. Therefore, it is possible to sufficiently burn and remove the PM collected in the filter with catalyst 13 and regenerate the filter with catalyst 13b. In the case other than the above, it is also possible to efficiently regenerate the filter with catalyst 13b, because a forced regeneration is performed for remained period of time of regeneration continuing to the previous forced regeneration.

The above explanation deals with the example of a DPF device in the exhaust gas purification system realized as a DPF device providing an oxidation catalyst on the upstream side of the filter while also making a catalyst supported on the filter; however, the present invention is not restricted to this embodiment. Furthermore, the DPF may also be of the type not making a catalyst supported on the filter, making an oxidation catalyst supported on the filter and providing an oxidation catalyst on the upstream side of the filter, etc.

What is claimed is:

1. A control method for an exhaust gas purification system, in an internal combustion engine mounted on a vehicle provided with a diesel particulate filter device in the exhaust passage thereof, having a diesel particulate filter control means including:

a collecting area detection means in which the collecting quantity area where the quantity of the collected matters collected in the filter of said diesel particulate filter device belongs to is detected from within a plurality of collecting quantity areas which are sectionalized depending on the quantity of collected matters;

a travel distance area detection means in which the travel distance area where the travel distance belongs to is detected from within a plurality of travel distance areas which are sectionalized depending on the travel distance;

a regeneration timing judgment means for judging the regeneration timing of the filter; and a forced regeneration control means for performing the forced regeneration of the filter by raising the exhaust gas temperature, wherein said diesel particulate filter control means actuates the forced regeneration control means when it is judged to be in a regeneration timing by the regeneration timing judgment means, when the forced regeneration is restarted after interrupting the forced regeneration by the forced regeneration control means, and in at least any one of cases where the collecting quantity area detected by the collecting quantity area detection means is in another collecting quantity area having a collecting quantity larger than that of the collecting quantity area immediately after interruption, or where the travel distance area detected by the travel distance area detection means is another travel distance area, having a travel distance larger than that of the travel distance area immediately after interruption, the forced regeneration is performed from the start, and in other case, the forced regeneration is performed for the remained period of time of the previous forced regeneration, continuing to the previous forced regeneration.

2. The control method for the exhaust gas purification system of claim 1, wherein said diesel particulate filter control means comprises:

a manual regeneration mode for performing the forced regeneration control of the filter when a driver presses a manual regeneration switch upon a warning to perform a regeneration control in a vehicle stationary idling condition; and an automatic traveling regeneration mode for automatically performing the forced regeneration control of the filter when a vehicle travels.

3. An exhaust gas purification system, in an internal combustion engine mounted on a vehicle provided with a diesel particulate filter device in the exhaust gas passage thereof, having a diesel particulate filter control means including:

a collecting area detection means in which the quantity area where the quantity of the collected matters collected in the filter of said diesel particulate filter device belongs to is detected from within a plurality of collecting quantity areas which are sectionalized depending on the quantity of collected matters;

a traveling distance area detection means in which the travel distance area where the travel distance belongs to is detected from within a plurality of travel distance areas which are sectionalized depending on the travel distance;

a regeneration timing judgment means for judging the regeneration timing of the filter; and a forced regeneration control means for performing the forced regeneration of the filter by raising the exhaust gas temperature, in which said diesel particulate filter control means actuates the forced regeneration control means when it is judged to be in a regeneration timing by the regeneration timing judgment means, wherein said diesel particulate filter control means is so constituted that when restarting the forced regeneration after interrupting the forced regeneration by the forced regeneration control means, and in at least any one of cases where the collecting quantity area detected by the collecting quantity area detection means is in another collecting quantity area having a collecting quantity larger than that of the collecting quantity area immediately after interruption, or where the travel distance area detected by the travel distance area detection means is in another travel distance area having a travel distance larger than that of the travel distance area immediately after interruption, the forced regeneration is performed from the start, and in other case, the forced regeneration is performed for the remained period of time of the previous forced regeneration, continuing to the previous forced regeneration.

4. The exhaust gas purification system of claim 3, wherein said diesel particulate filter control means comprises:

a manual regeneration mode for performing the forced regeneration control of the filter when a driver presses a manual regeneration switch upon warning to perform a regeneration control under a vehicle stationary idling condition; and an automatic traveling regeneration mode for automatically performing the forced regeneration control of the filter when a vehicle travels.

5. The exhaust gas purification system of claim 3 or 4, wherein the diesel particulate filter device is constituted of any one or a combination of:

a diesel particulate filter device formed of a filter without supporting catalyst;

a continuous regeneration-type diesel particulate filter device supporting an oxidation catalyst on the filter;

a continuous regeneration-type diesel particulate filter device in which an oxidation catalyst is installed on the upstream side of the filter; and a continuous regeneration-type diesel particulate filter device in which an oxidation catalyst is supported on the filter and an oxidation catalyst is installed on the upstream side of the filter.

* * * * *